United States Patent [19]

Sievert et al.

[11] Patent Number: 4,750,687
[45] Date of Patent: Jun. 14, 1988

[54] FISHING REEL

[76] Inventors: Albert V. Sievert, 149 E. Kendall Ave.; Steven A. Sievert, 1236 N. Mono Ct., both of Ridgecrest, Calif. 93555

[21] Appl. No.: 34,912

[22] Filed: Apr. 6, 1987

[51] Int. Cl.⁴ .................. A01K 89/015; A01K 89/02
[52] U.S. Cl. ............................ 242/218; 242/84.51 A
[58] Field of Search .................. 242/84.1 R, 211, 217, 242/218, 219, 220, 221, 84.5 R, 84.5 A, 84.51 R, 84.51 A, 84.53

[56] References Cited

U.S. PATENT DOCUMENTS

| 929,867 | 8/1909 | Meisselbach et al. | 242/220 |
|---|---|---|---|
| 1,781,695 | 11/1930 | Mitchell-Henry | 242/84.5 R X |
| 1,948,886 | 2/1934 | Russell | 242/220 |
| 1,995,221 | 3/1935 | Peel et al. | 242/84.5 R |
| 2,162,726 | 6/1939 | King | 242/214 |
| 2,306,259 | 12/1942 | Khoenle | 242/84.5 R |
| 2,314,332 | 3/1943 | Coxe et al. | 242/84.51 R |
| 2,620,052 | 12/1952 | Andersson | 242/220 |
| 3,139,241 | 6/1964 | Johnson | 242/214 |
| 3,499,609 | 3/1970 | Policansky | 242/214 |
| 3,652,031 | 3/1972 | Kosek | 242/84.5 R X |
| 3,829,041 | 8/1974 | Nepote | 242/218 |
| 3,874,615 | 4/1975 | Fukushima | 242/219 |
| 3,958,771 | 5/1976 | Everett et al. | 242/84.5 R |
| 4,056,246 | 11/1977 | Purcell | 242/219 |
| 4,131,245 | 12/1978 | Noda | 242/217 |
| 4,484,720 | 11/1984 | Tunoda | 242/218 |
| 4,515,325 | 5/1985 | Ito | 242/84.51 R |
| 4,579,296 | 4/1986 | Karlsson et al. | 242/220 |

FOREIGN PATENT DOCUMENTS 4391 of 1911 United Kingdom ......... 242/84.51 R

OTHER PUBLICATIONS

Advertising Brochure Entitled "The Inside Story of the Anti-Reverse Fin-Nor Fly Reels" date unknown.
Parts List of a System Two Fly Reel Manufactured by The 3M Company, date unknown.
Advertisment for the System Two Fly Reel Manufactured by The 3M Company, date unknown.
Advertisement for the System One Fly Reel Manufactured by The 3M Company, date unknown.

Primary Examiner—John Petrakes
Assistant Examiner—Joseph J. Hail, III
Attorney, Agent, or Firm—Worrel & Worrel

[57] ABSTRACT

A fishing reel adapted to be mounted on a fishing pole and having a housing which rotatably mounts a clutch, a spool and a handle. The housing further mounts an adjustable disc brake which is operable to impart frictional resistance to the spool when it is rotated in a line dispensing direction. The fishing reel is operable to be rotatably urged in a line retrieval direction by the handle which moves a pair of pivotally mounted dogs into engagement with the spool. The handle is adapted immediately to disengage from the spool when it is rotatably urged in the line dispensing direction.

11 Claims, 4 Drawing Sheets

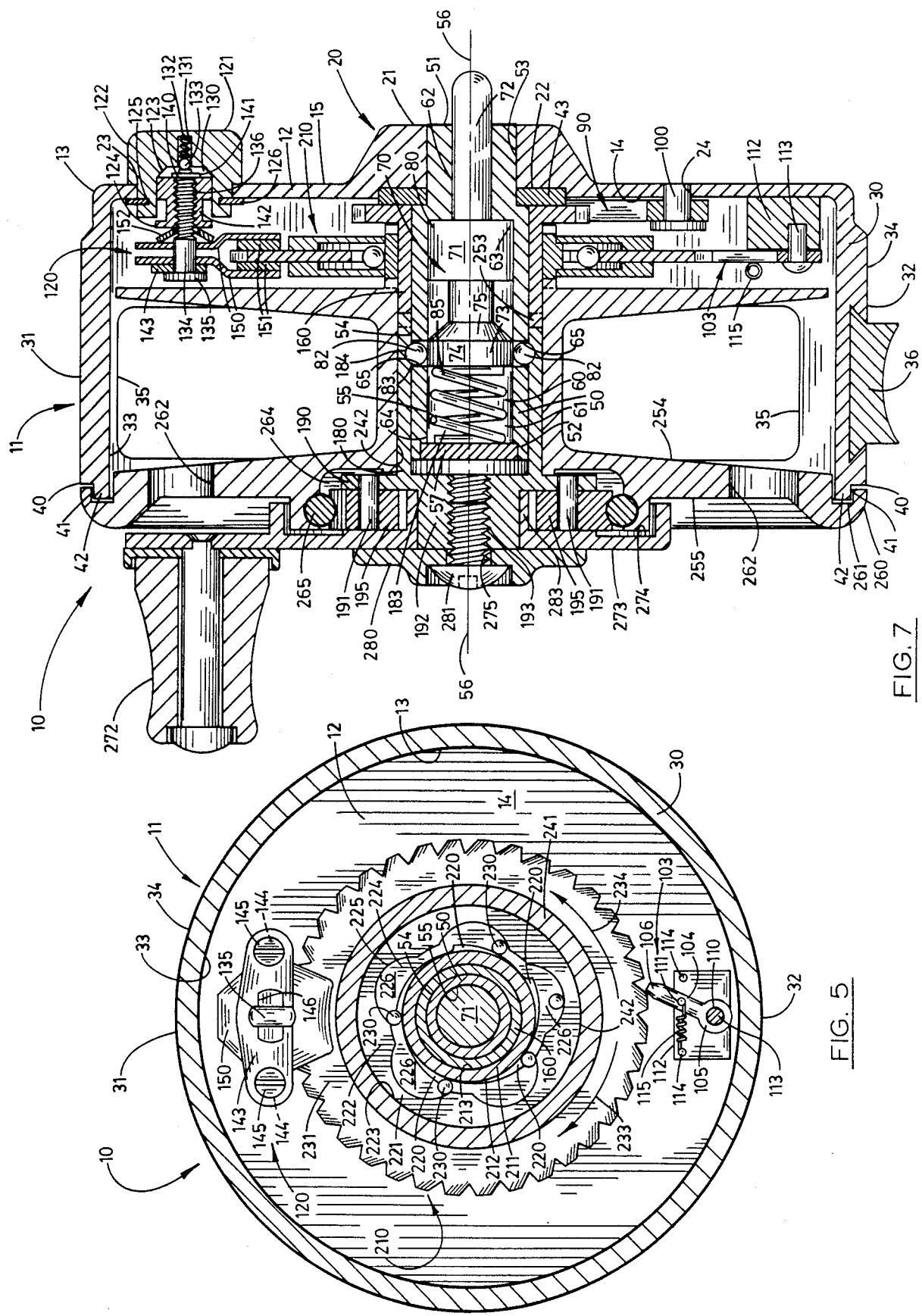

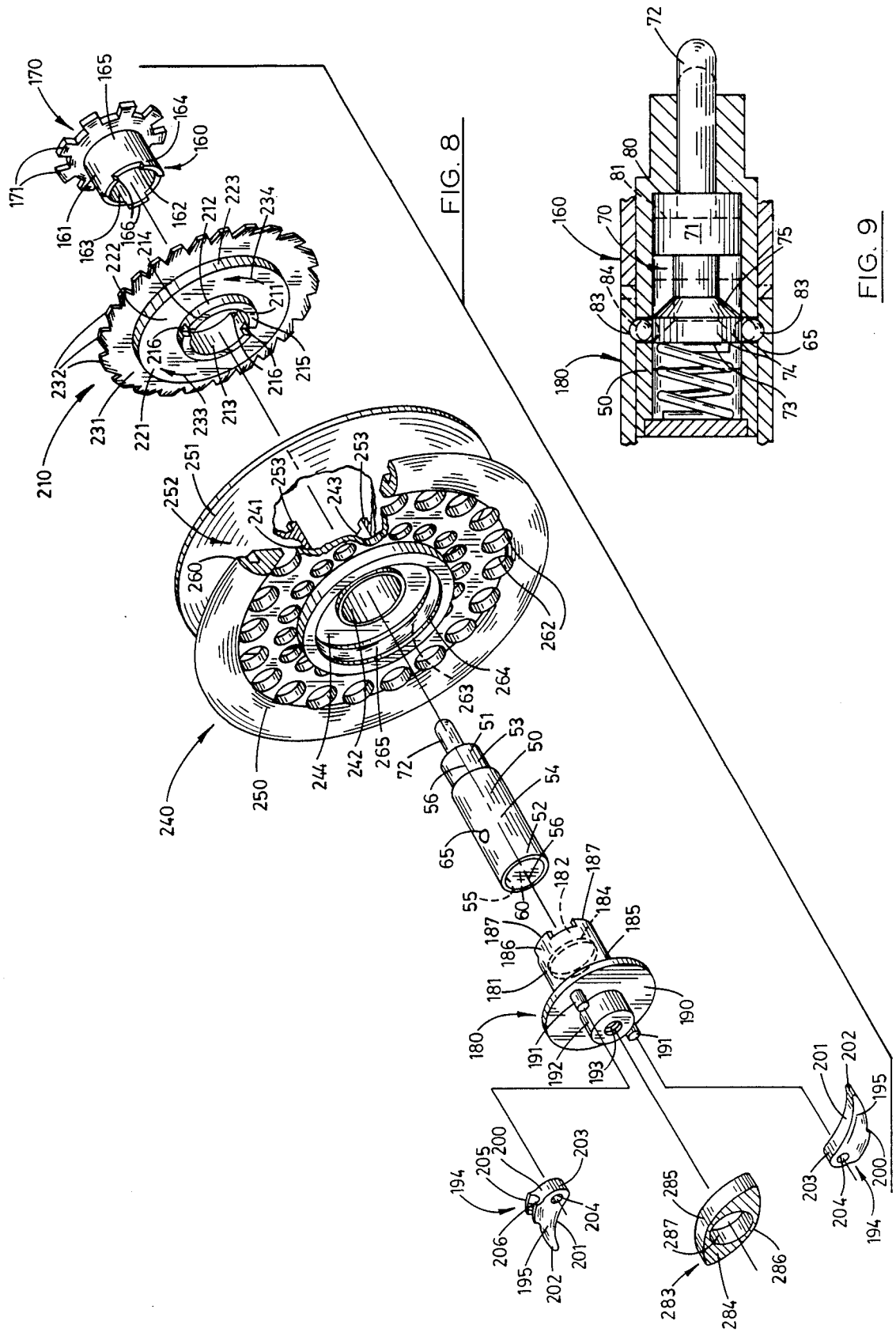

FISHING REEL

BACKGROUND OF THE INVENTION

1. Field of the Invention

The present invention relates to a fishing reel, and more particularly to a fishing reel that is relatively inexpensive to manufacture and maintain and which has improved performance characteristics relative to the prior art devices designed for essentially the same purpose, the fishing reel having a smooth, quite, non-interrupted, and improved direct drive for the spool, and an adjustable drag sub-assembly, each of which imparts enhanced operational characteristics to the fishing reel under a variety of fishing conditions.

2. Description of the Prior Art

One of the activities most enjoyed by outdoor enthusiasts is that of fishing. With the advent of improved high performance rods and reels, and the development of a variety of other lightweight tackle and assorted accessories, this sport has recently gained new popularity and is now enjoyed by relatively large numbers of sportsmen of all levels of fishing ability.

Whether the angler is a relative novice or an experienced veteran, all fishermen tend to agree that one of the most important considerations to take into account when purchasing their respective fishing reel is the ease with which the fishing reel can be handled; that is, the ability for the reel to be quickly adjusted in a variety of different fashions to permit the angler to "play" the fish he is trying to catch. Fishermen of all levels of ability also readily recognize that it is highly desirable to have a fishing reel which utilizes a drag sub-assembly which is adapted to impart frictional resistance to the spool for the purposes of slowing the rotation of the spool as the fishing line is stripped therefrom after a fish has "struck" the lure and taken the fishing line on a "run", and in addition providing the added feature of preventing line "overrun."

The beneficial effects of employing a fishing reel having a drag sub-assembly have been known for some time. As a general matter, drag sub-assemblies of various operational configurations have been developed for essentially the same purpose; that is, for engaging the spool to slow its rotation and thus exhaust the particular fish. In some of these devices, for example, various brake assemblies are employed, which engage the spool or other sub-assembly for the purpose of imparting or transmitting frictional resistance to the spool.

While the prior art is replete with numerous fishing reels and assorted drag sub-assemblies that produce numerous laudable results, including providing means for rapidly adjusting the amount of drag imparted to the spool of the fishing reel, they have also suffered from a multiplicity of drawbacks which have detracted from their usefulness. For example, some of the prior art fishing reels employ a complex drag sub-assembly which utilizes a rather complex gear arrangement. This is most accurately illustrated by reference to U.S. Pat. No. 2,162,726 to King. Although these designs are somewhat effective, they have a drawback inasmuch as it is generally the case that they impart frictional resistance to the spool when it is rotated in either the line retrieval direction or the line dispensing direction. Therefore, it is usually necessary for the fisherman to release the drag sub-assembly when retrieving the line. Moreover, these various devices usually are difficult to repair and are frequently cumbersome to employ when being used on a fish that is putting up a fight.

Still other significant problems with the prior art devices result from characteristics inherent in their design. For example, such prior art fishing reels often have cranks or other transmission assemblies which are directly mounted to the spool, the cranks being adapted to rotate the spool in a line retrieval direction. As should be appreciated, this physical arrangement of the spool and the crank usually works quite well when utilized to retrieve the fishing line. However, it is not a very satisfactory arrangement when the fishing line is being stripped from the spool at a high rate of speed after a fish has struck the lure. Anglers of all levels of ability understand that in this situation, it is frequently the case that the fisherman's thumb is struck by the rapidly revolving crank, thus causing some discomfort.

Therefore, it has long been known that it would be desirable to have a fishing reel which mounts a drag sub-assembly which imparts frictional resistance to the spool when it is rotated in a line dispensing direction only, the fishing reel further mounting a handle which imparts rotational movement to the fishing reel in the line retrieval direction but which further is adapted, immediately, to disengage from the spool and remain motionless when the spool is rotated in a line dispensing direction.

SUMMARY OF THE INVENTION

Therefore, it is an object of the present invention to provide an improved fishing reel.

Another object is to provide such a fishing reel which is particularly well suited to rotate a spool in a line retrieval direction and which is further operable when the spool is rotated in a line dispensing direction to impart frictional resistance to the spool to retard its speed of rotation.

Another object is to provide such a fishing reel which mounts a handle that imparts rotational movement to the spool in the line retrieval direction, but which is further operable immediately to disengage from the spool, and remain motionless, when the spool is rotated in a line dispensing direction.

Another object is to provide such a fishing reel which allows for rapid conversion from left-handed to right-handed operation without the use of tools.

Another object is to provide such a fishing reel which mounts a drag sub-assembly which imparts adjustable frictional resistance to the spool when it is rotated in the line dispensing direction.

Another object is to provide such a fishing reel which is operable to obtain the individual benefits to be derived from the prior art fishing reel devices while avoiding the detriments individually associated therewith.

Another object is to provide such a fishing reel which mounts a clutch having a ratchet wheel, the clutch disposed in intermeshing relation to the spool and engaged by the drag assembly, the clutch operable to transmit frictional resistance to the spool when it is rotated in a line dispensing direction.

Another object is to provide such a fishing reel which is of relatively nominal cost to purchase and maintain, and which is additionally characterized by simplicity of design and ease of utilization.

Another object is to provide such a fishing reel that mounts a spring-biased plunger which is operable detachably to mount the spool in an operational attitude on the fishing reel.

Further objects and advantages are to provide improved elements and arrangements thereof for an apparatus for the purposes described which is dependable, economical, durable and fully effective in accomplishing its intended purposes.

These and further objects and advantages are achieved in a fishing reel of the subject invention wherein the fishing reel has a housing which rotatably mounts a spool and a drag assembly; the fishing reel further having a handle which is operable to impart rotational movement to the spool in a line retrieval direction only, the fishing reel operable, when the spool is rotated in a line dispensing direction to impart frictional resistance to the spool, the handle of the fishing reel remaining motionless as the spool is rotated in the line dispensing direction.

BRIEF DESCRIPTION OF THE DRAWINGS

FIG. 5 is a transverse, vertical section taken on line 5—5 of FIG. 3 and showing the clutch of the subject invention.

FIG. 7 is a transverse, vertical section taken on line 7—7 of FIG. 1 and showing a spring-biased plunger which detachably mounts the spool on the housing.

FIG. 8 is a partial exploded view of the fishing reel of the subject invention with some sub-assemblies and supporting surfaces removed for purposes of illustrative convenience.

FIG. 9 is a partial longitudinal, vertical section of the spring-biased plunger of the subject invention and showing the plunger and a pair of ball bearings in a first position in full lines and in a second position in phantom lines.

DESCRIPTION OF THE PREFERRED EMBODIMENT

Figure 1:
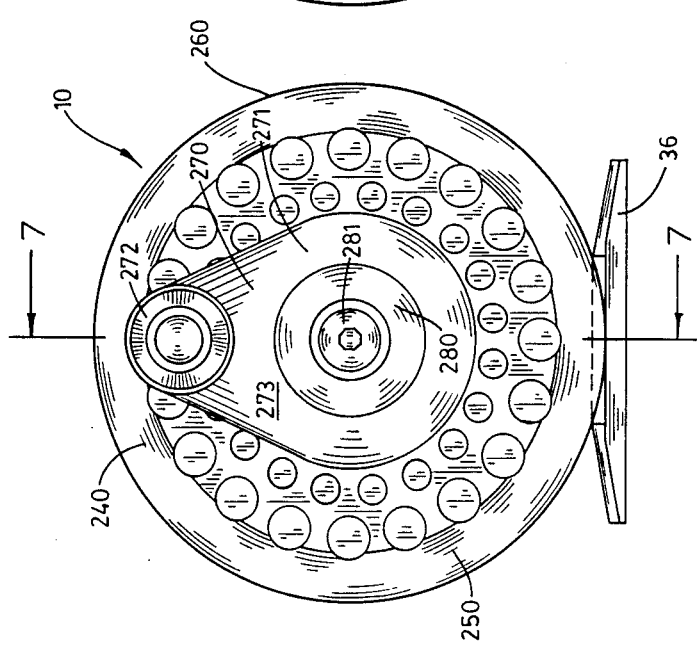
FIG. 1 is a side elevation of the fishing reel of the subject invention.

Referring more particularly to the drawings, the fishing reel embodying the principles of the present invention is generally indicated by the numeral 10 in FIG. 1. For illustrative convenience, the apparatus as shown and described herein is discussed as it would be configured if it were mounted on a conventionally designed fishing pole or the like, which is not shown.

Figure 3:
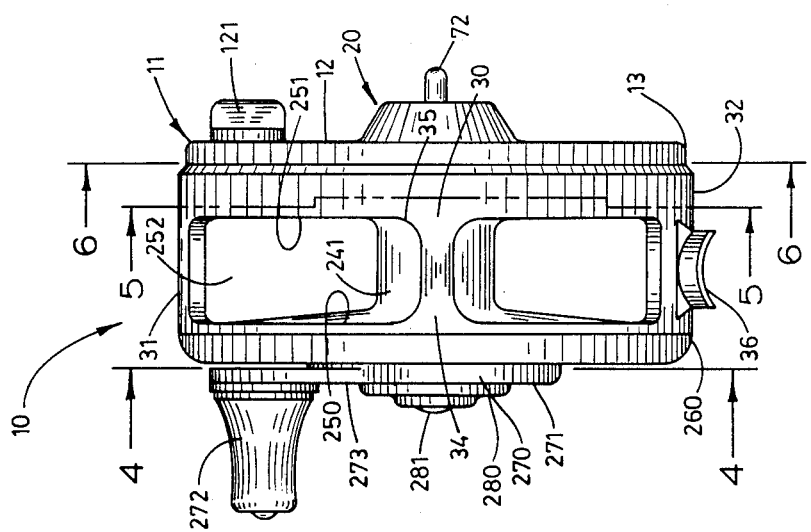
FIG. 3 is a front elevation of the fishing reel of the subject invention.
Figure 2:
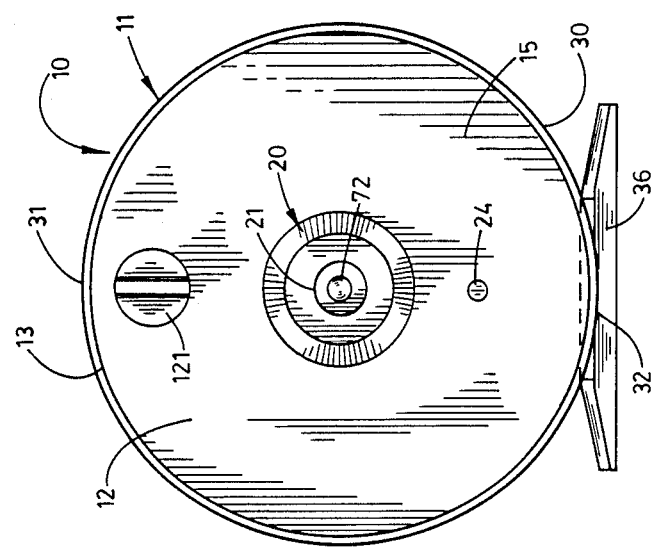
FIG. 2 is a side elevation of the fishing reel of the subject invention taken from a position opposite to that shown in FIG. 1.

The apparatus 10 has a substantially circular housing generally indicated by the numeral 11 in FIG. 2. The housing has a circular wall 12, which has a peripheral edge 13, an inside surface 14, and an outside surface 15. As best understood by reference to FIG. 3, the circular wall has an elevated or thickened mid-portion of frusto-conical shape which is indicated by the numeral 20. The thickened mid-portion 20 has a receiving station 21 which is formed substantially centrally thereof. Formed into the inside surface 14 of the housing 11, in an attitude substantially concentrically about the receiving station 21 is a washer seat 22. Formed into the circular wall at predetermined positions are first and second apertures 23 and 24, respectively.

Disposed in a substantially normal attitude with respect to the circular wall 12 is a peripheral wall generally indicated by the numeral 30. The peripheral wall has a top portion 31, a bottom portion 32, an inside surface 33 and an outside surface 34. Formed in predetermined attitudes in the peripheral wall is a plurality of elongated apertures 35. Affixed to the bottom portion 32 of the peripheral wall is a mounting bracket 36 which is adapted to be affixed by clamps and the like to a conventionally designed fishing pole which is not shown. As best seen by reference to FIG. 7, the peripheral wall has an outside edge 40 which has formed therein a recessed seat 41. The recessed seat 41 defines a flange 42. A thrust washer 43 of appropriate dimension is received in the washer seat 22 which is formed into the circular wall 12.

Mounted to and disposed substantially concentrically of the housing 11 is an elongated, substantially hollow shaft generally indicated by the numeral 50. The shaft 50 has a proximal end 51 and a distal end 52. Formed about the proximal end 51 is a reduced diameter portion 53 which is conformably dimensioned slidably to mate with the thrust washer 43 and the receiving station 21 which is formed substantially centrally of the thickened mid-portion 20 of the circular wall 12. The shaft further has an exterior surface 54, an interior surface 55, and a longitudinal axis generally indicated by the line labeled 56. As best seen by reference to FIG. 7, a cap 57 is suitably affixed on and about the distal end 52 of the shaft. The interior surface 55 of the shaft defines a channel 60 which has a first portion 61, and a reduced diameter second portion generally indicated by the numeral 62. The first portion 61 of the channel 60 has a first end 63 and an opposed second end 64. A pair of radially disposed channels 65 extend through the shaft 50 and are adapted to communicate with the channel 60.

A spring-biased plunger, which is generally indicated by the numeral 70, has a main body 71 that is conformably dimensioned slidably to be received internally of the channel 60 which is defined by the interior surface 55 of the shaft 50. The plunger 70 has a reduced diameter shaft 72 which is conformably dimensioned slidably to be received internally of the second reduced diameter portion 62 of the channel 60. The plunger further has a head portion 73, which has an annular side wall 74 which is dimensioned slidably to be received internally of the first portion 61 of the channel 60. The head 73 further has a frusto-conical shaped side wall 75. The spring-biased plunger is movable in a longitudinal path of travel from a first position 80, wherein the main body is disposed at the first end of the first portion 61 of the channel 60, to a second position 81 wherein the main body 71 is disposed in spaced relation to the first end 63. As should be understood, when the plunger 70 is disposed in the first position 80, the head 73 is disposed in an attitude wherein the annular side wall 74 is substantially aligned, and in registry with, the pair of radially disposed channels 65 which are formed in the shaft 50; and when the plunger is moved to the second position 81, the frusto-conical shaped side wall 75 is substantially aligned with the pair of radially disposed channels.

As best understood by reference to FIG. 9, the pair of radially disposed channels 65 are dimensioned slidably to receive and capture a ball detent or ball bearing 82 therein. The ball bearings 82 are movable between a first locked attitude 83, wherein the ball bearings extend somewhat slightly beyond the exterior surface 54 of the shaft 50, and a second retracted attitude 84. It should be understood that the plunger 70 is adapted, when disposed in the first position 80 to retain the ball bearings 82 in the first locked attitude 83 and when urged to the second position 81 to permit the ball bearings to move to the second retracted attitude 84. A spring 85 is disposed substantially centrally of the channel 60 to urge the plunger into the first position 80.

Figure 6:
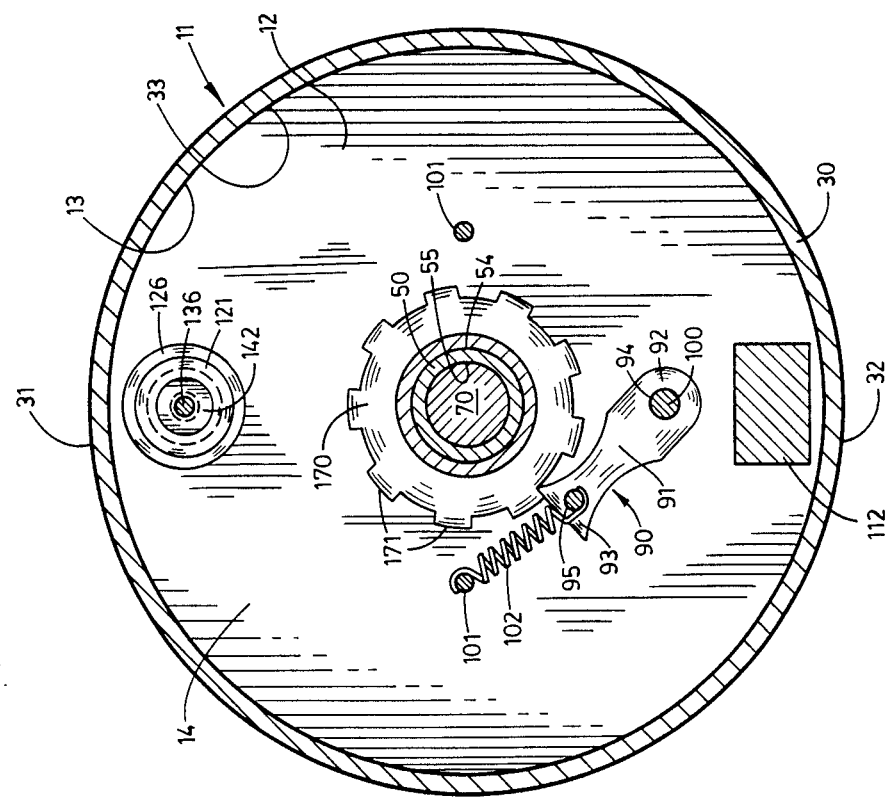
FIG. 6 is a transverse, vertical section taken on line 6—6 of FIG. 3 and showing a first spring-biased pawl mounted on the housing of the subject invention.

As best illustrated by reference to FIG. 6, a first spring-biased pawl, generally indicated by the numeral 90 is rotatably mounted internally of the housing 11. The first pawl 90 has a main body 91, a first end 92, and a second end 93. Formed into the first end 92 is an orifice 94. Mounted to and disposed in close proximity to the second end 93 is a spring retaining stud 95. The first pawl 90 is rotatably mounted to the circular wall 12 by a rivet 100 which is received through the orifice 94 and into the second aperture 24 which is formed into the circular wall. This is most clearly illustrated by reference to FIG. 7. A pair of spring anchoring posts 101 are mounted to the circular wall in an attitude which is best illustrated by reference to FIG. 6. Disposed between one of the spring anchoring posts and the spring retaining stud is a spring 102 which is adapted to retain the first pawl in a preselected locking attitude. As should be appreciated, only one of the pair of spring anchoring posts is utilized at any given time. The other spring anchoring post is provided for those occasions wherein the fishing reel 10 is converted for usage by left-handed anglers.

As best illustrated by reference to FIG. 5, a second spring-biased pawl 103 is rotatably mounted to the housing 11. The second pawl 103 has a main body 104 having a first end 105 and a second end 106. The second pawl has an orifice 110 formed in its first end 105 and also has a spring retaining stud 111 mounted to, and disposed in close proximity with, the second end 106. Affixed to the inside surface 14, of the circular wall 12, in close proximity to the bottom portion 32 of the peripheral wall 30 is a spacer 112. A rivet 113, of appropriate dimension, is received through the orifice 110 and into the spacer 112. A pair of spring anchor posts 114 are mounted to the spacer, and a spring 115 is disposed between one of the spring anchor posts 114 and the spring retaining stud 111 which is mounted on the main body 104 of the second pawl 103. The pair of spring anchor posts 114 are provided to permit the fishing reel 10 to be converted for use by left-handed or right-handed anglers. The second pawl is adapted to generate sound when the spool, which will hereinafter be discussed in greater detail, is rotated in a line dispensing direction. Furthermore, the second pawl imparts a predetermined amount of drag to the spool to prevent line overrun.

A disc brake, generally indicated by the numeral 120 is mounted to the housing 11 and is adapted to impart frictional resistance, or drag, to the spool which will hereinafter be described in greater detail. The disc brake 120 mounts an adjustment knob 121 which is received through the first aperture 23 that is formed into the circular wall 12 of the housing. The knob 121 has an exterior surface 122 and an interior surface 123. Formed into the exterior surface 122 is a neck 124 of reduced diameter. Formed into the neck 124 is a channel of annular configuration 125, which is adapted to receive a retaining clip 126 which holds the knob 121 in rotatable mating relation with the housing 11. The interior surface 123 of the knob defines a first channel 130 and a second channel 131. As best seen by reference to FIG. 7, the second channel 131 mounts a spring 132 and a small ball bearing 133. The disc brake 120 further has an adjustment screw generally indicated by the numeral 134, which has a first end 135, and a threaded second end generally indicated by the numeral 136. An orifice 140 is formed in the second end 136, the orifice is adapted to receive a pin 141. A nut 142 is conformably dimensioned slidably to be received internally of the first channel 130 and screw-threadably dimensioned to be received on the second end 130. As should be appreciated, rotational movement of the knob 121 imparts a corresponding rotational movement of the nut 142. As the nut is rotated, it slides internally of the first channel 130 and upwardly or downwardly along the second end 136 depending upon the direction of rotation. A mounting plate 143 is screw-threadably affixed to the housing 11. The mounting plate has formed therein a pair of orifices 144 which are adapted to receive a pair of mounting screws 145. The pair of mounting screws are screw-threadably received into a pair of spacers, not shown, that are mounted to the inside surface 14 of the circular wall 12. The spacers permit the disc brake to be held in fixed spaced relation to the inside surface 14 of the circular wall 12. Slidably received on the adjustment screw 134 is a pair of callipers of angular configuration which are each indicated by the numeral 150. Each calliper mounts a brake pad 151. Slidably mounted on the adjustment screw 134 is a small spring washer 152 which is disposed between one of the callipers 150 and the nut 142. As should be understood, rotation of the nut 142 causes the pair of callipers 150 to be urged together into mating relation with the clutch which will hereinafter be discussed in greater detail.

As best seen by reference to FIG. 8, a first bushing, generally indicated by the numeral 160 is slidably mounted on the shaft 50. The first bushing has an exterior surface 161, and an interior surface 162 which defines a substantially circular channel 163. The first bushing further has a proximal end 164 and a distal end 165. The proximal end of the first bushing has a multiplicity of teeth 166 formed therein which are adapted to engage or otherwise intermesh with a second bushing which will hereinafter be discussed in greater detail. Mounted at the distal end 165 of the first bushing is a gear 170 that has a multiplicity of teeth 171 which engage the first spring-biased pawl 90. It should be understood that the first spring-biased pawl is operable to permit rotation of the first spring-biased pawl is operable to permit rotation of the first bushing in a first clockwise direction only, as it is viewed in FIG. 6 or 8. A second bushing, generally indicated by the numeral 180, is also slidably disposed on the shaft 50. The second bushing has an exterior surface 181, and an interior surface 182 which defines a channel 183. Formed into the interior surface 182 and disposed transversely to the longitudinal axis 56 is an annular locking channel 184. As best understood by reference to FIG. 7, the annular locking channel receives each of the ball bearings 82 when they are disposed in the first locked attitude 83. The second bushing further has a first end 185, and a second end 186, the second end having formed therein a plurality of teeth 187 which are adapted to engage or intermesh with the first bushing 160.

An annular flange 190 is mounted at the first end 185 of the second bushing 180. The flange 190, which is disposed transversely of the longitudinal axis 56, mounts a pair of posts 191; and a short shaft 192, which is disposed substantially centrally of the flange 190 and coaxially aligned with the longitudinal axis. Formed substantially centrally of the short shaft 192 is a threaded channel 193. A pair of dogs or leaves, which are generally indicated by the numeral 194, are pivotally mounted on the second bushing 180. Each of the dogs has a main body 195 which has a top surface 200, a bottom surface 201, a first end 202 and a second end 203. Formed into the second end of each dog is an orifice 204 which is dimensioned slidably to receive one of the posts 191 therein. A curved channel 205 is formed into the top surface 200 of each of the dogs 194. Each of the curved channels, as best shown by reference to FIG. 8, has a scored surface 206 formed therein. As should be understood, the pair of dogs 194 would be reversed in their relative positions in the event the fishing reel 10 was converted from right-handed to left-handed operation.

A clutch which is generally indicated by the numeral 210, is dimensioned slidably to be received on the first bushing 160. The clutch posseses a central bushing 211 which has an external surface 212, an internal surface 213, a first end 214 and a second end 215. As best illustrated by reference to FIG. 8, the first and second ends 214 and 215, respectively, have a pair of notches generally indicated by the numeral 216 formed therein. A plurality of clutch teeth 220 are formed into the external surface 212 of the central bushing 211. Rotatably mounted on and about the external surface 212 of the central bushing is a substantially circular housing 221. The housing 221 has a pair of circular walls 222 which are joined together by an outside or peripheral wall 223. The housing 221 has an internal chamber 224 which is defined by a peripheral surface 225. The peripheral surface 225 further defines a plurality of pockets 226 which are disposed in close proximity to the external surface 212 of the central bushing 211. As best illustrated by reference to FIG. 5, a plurality of ball bearings 230 are individually disposed in the pockets 226. Affixed to the outside or peripheral wall 223 and disposed substantially concentrically about the housing 221 is a ratchet wheel 231. The ratchet wheel is of conventional configuration having a plurality of teeth 232 which engage the second spring-biased pawl 103. As should be appreciated by a study of FIG. 5, the central bushing 211 is operable to rotate freely in a first or clockwise direction 233; the central bushing not engaging the housing 221 which is rotatably mounted upon it. This is a result of the ball bearing 230 riding over the clutch teeth. The central bushing 211 is also operable when rotated in a second, or counterclockwise direction 234 as viewed in FIG. 5, to capture the ball bearings 230 between the peripheral surface 225 of the internal chamber 224 and the clutch teeth 220. Thus, it should be understood that when the central bushing 211 is rotated in the second direction, the central bushing engages the housing, thus causing the housing to rotate in the same direction. Rotation of the housing in the second direction also causes the ratchet wheel 231 to be moved through the disc brake 120 and into engagement with the second spring-biased pawl 103. It should be further understood that if the clutch were removed from the first bushing and mounted in the reverse direction the opposite reaction would result, that is, the central bushing 211 would rotate freely in the second or counterclockwise direction and would be operable to engage and rotate the housing when it was urged in the first or clockwise direction. This permits the fishing reel 10 to be utilized by both left-handed and right-handed anglers.

Figure 4:
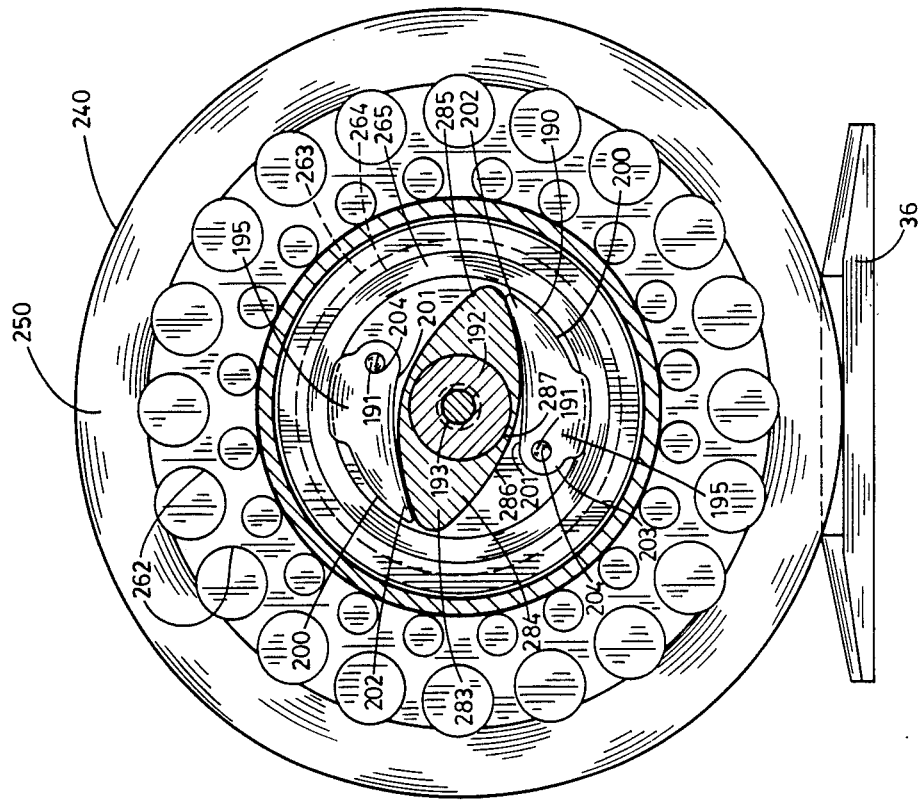
FIG. 4 is a transverse, vertical section taken on line 4—4 of FIG. 3 and showing a pair of pivotally mounted dogs, and a cam engageable therewith.

A spool which is generally indicated by the numeral 240 is conformably dimensioned rotatably to be received on and about the first and second bushings 160 and 180, respectively, as best illustrated by reference to FIG. 7. The spool 240 has a cylindrical core 241 which defines a channel 242. The cylindrical core 241 has a first end 243 and a second end 244. Mounted to and disposed in a substantially normal attitude with respect to the first and second ends 243 and 244 is a first and second wall 250 and 251. As best illustrated by reference to FIG. 3, the first and second walls 250 and 251 define a space 252 which is adapted to receive a supply of fishing line, not shown. Mounted to the first end 243 of the cylindrical core 241 is a pair of teeth 253 which are each dimensioned to be individually received in intermeshing relation with the pair of notches 216 which are formed in the central bushing 211 of the clutch 210. It should be appreciated, therefore, that the spool is adapted to impart rotational movement to the central bushing 211 in either the first or second direction, 233 or 234, respectively. The first wall 250 has an inside surface 254, an outside surface 255 and a peripheral edge 260 which can be utilized by the angler to impart additional frictional resistance to the spool. Disposed in close proximity to the peripheral edge 260 and formed into the inside surface 254, is an annularly shaped channel 261 which is dimensioned to received the flange 42 which is defined by the recessed seat 41 of the outside edge 40. The first wall 250 of the spool 240 further has formed therein a multiplicity of drying holes 262 which permit air to pass through and thus dry the supply of fishing line, not shown, that is stored on the spool. Mounted to the outside surface 255 of the first wall 250 of the spool 240 and disposed substantially concentrically about the channel 242 is an annularly shaped race 263. The annular race 263 has an inside lip 264 which is adapted to capture a substantially circular O-ring which is manufactured out of rubber or other resilient material and the like. The annular race 263 is further dimensioned slidably to receive the flange 190 which is mounted on the second bushing 180. This relationship is best illustrated by reference to FIG. 4.

Detachably mounted in screw-threadable mating engagement to the second bushing 180 and disposed in rotatable mating relation with the spool 240 is a handle or crank generally indicated by the numeral 270. The handle 270, which is adapted to impart rotational movement to the spool, has a main body 271 which mounts a rotatable grip generally indicated by the numeral 272. The main body further has an outside surface 273, an inside surface 274 and an orifice 275 which is disposed in coaxial alignment with the longitudinal axis 56. A washer or cap 280 is screw-threadably mounted on the main body 271 by a screw 281 which is received in the threaded channel 193 which is formed in the short shaft 192 of the second bushing 180. Formed into, or mounted to, the inside surface 274 is a cam 283 which is best illustrated by reference to FIG. 8. The cam is of conventional design having a first camming surface 285 and an opposed camming surface 286. An orifice 287 is formed substantially centrally of the cam 283, the orifice adapted slidably to receive the short shaft 192. This is best illustrated by reference to FIG. 4. It should be understood that as a fisherman imparts rotational movement of the grip 272 in the first or clockwise direction 233 as viewed in FIG. 1, the cam 283 is operable to engage the pair of dogs 194 and urge the top surface 200 thereof into mating engagement with the O-ring 265 which is received in the annular race 263. Upon engagement with the O-ring the handle or crank imparts rotational movement to the spool 240.

OPERATION

The operation of the described embodiment of the present invention is believed to be readily apparent and is briefly summarized at this point.

The operation of the fishing reel 10 is best understood by reference to FIG. 8. When the handle or crank 270 is rotated in a first or clockwise direction 233, this direction of rotation representing the line retrieval direction, the cam 283 is operable to engage the pair of pivotally mounted dogs 194 which are mounted on the pair of posts 191 that are affixed on the annular flange 190 of the second bushing 180. As this event occurs, the pair of dogs are urged into mating engagement with the O-ring 265 thus causing rotational movement of the spool in the clockwise direction. Rotation of the handle in the clockwise direction also causes the first and second bushings 160 and 180, respectively, to rotate. As best illustrated by reference to FIG. 6, the gear 170, which is mounted on the first bushing is operable to permit rotation of the first and second bushings in the clockwise direction only, this direction of rotation limited by the first spring-biased pawl 90 which is operable to engage the gear 170 to prevent any significant counterclockwise rotation of the first and second bushing and the handle 270.

As the spool 240 is urged in the first or clockwise direction 233, the pair of teeth 253, which are mounted to the first end 243, of the cylindrical core 241, and which are engaged by intermeshing relation with the pair of notches 216 that are formed in the first end 214 of the central bushing 211 causes the clockwise rotation of the central bushing. The central bushing 211, as earlier discussed freely rotates in a clockwise direction. However, if the spool 240 is rotated in a counterclockwise direction 234, for example, when a fish has struck the lure and is taking a run, the spool can rapidly rotate in the line dispensing direction. When this event occurs, the counterclockwise rotation causes a corresponding counterclockwise rotation in the central bushing 211. As the counterclockwise rotation begins, the clutch teeth 220 are operable to capture the plurality of ball bearings 230 against the peripheral surface 225 of the housing 221, which in turn causes the housing 221, and the ratchet wheel 231 mounted thereto, to be rotated in the counterclockwise direction. To control the rate of speed at which the spool 240 dispenses line, the disc brake 120 is adjusted using the knob 121. By rotating the knob 121 in an appropriate direction, the pair of callipers 150, which each mount an individual brake pad 151, are urged together; the brake pads moving into braking engagement with the ratchet wheel and thus imparting frictional resistance to the spool as it is rotated in the counterclockwise direction. It should be appreciated that a fisherman can adjust the amount of frictional resistance or drag imparted to the spool for the purposes of tiring the fish which is on the end of the line. Similarly, it should be understood that as the spool rotates in the counterclockwise direction, the handle or crank 270 remains motionless inasmuch as when the spool rotates in a counterclockwise fashion, the pair of dogs 194 are urged out of engagement with the O-ring 265 which is received in the annular race 263. It should also be appreciated that when the ratchet wheel 231 rotates in a counterclockwise direction, sound is emitted from the second pawl 103 as it strikes the teeth 232 of the ratchet wheel.

The fishing reel 10 is easily disassembled for purposes of maintenance, modification or the like. The fisherman can easily disassemble the reel by exerting force on the reduced diameter shaft 72 of the spring-biased plunger 70. When the reduced diameter shaft is depressed, the ball bearings 82 which are individually slidably mounted in the pair of radially disposed channels 65 move from a first locked attitude 83 wherein they are matingly received in the annular locking channel 184 which is formed internally of the second bushing 180, to a second retracted attitude 84 wherein they are disposed substantially internally of the radially disposed channels. Upon moving to the second retracted position the first and second bushings 160 and 180, respectively, can be moved apart and the spool 240 can be removed therefrom.

Therefore, the fishing reel apparatus of the present invention is particularly well suited for use by anglers of all fishing abilities and can be quickly adjusted for various fishing conditions. The apparatus can be quickly assembled and disassembled for ease of maintenance, is easily manipulated by hand, and can be quickly converted for use by left-handed or right-handed anglers. The fishing reel further has a drag sub-assembly which imparts smooth, quiet and non-interrupted frictional resistance to the spool as it rotates in the line dispensing direction and a handle which imparts rotational movement to the spool in a line retrieval direction but which is adapted immediately to disengage from the spool and remain motionless when the spool is urged in a line dispensing direction. Moreover the fishing reel can be constructed and sold at a relatively nominal price when compared with other prior art assembles which were designed for approximately the same purpose.

Although the invention has been herein shown and described in what is conceived to be the most practical and preferred embodiment, it is recognized that departure may be made therefrom within the scope of the invention which is not to be limited to the illustrative details disclosed.

Having described our invention, what we claim as new and desire to secure by Letters Patent is:

1. A fishing reel adapted to be mounted on a fishing pole comprising:

a housing adapted to be mounted on the fishing pole and mounting a shaft substantially centrally thereof having a longitudinally disposed channel therein;

a spool rotatably mounted on the housing and adapted to be rotated alternatively in a first direction and in a second direction, said spool further having a channel which has a first and second end, said first end mounting a pair of teeth and the second end mounting a race;

clutch means mounted on the housing and engaged by the pair of teeth;

a first bushing, a second bushing, and a handle for imparting rotational movement to the spool in the first direction, said first and second bushings slidably borne on the shaft and dimensioned slidably to be received internally of the channel, said first bushing matingly non-rotatably engaging the second bushing and said second bushing mounts an annular flange which mounts a pair of pivotally mounted dogs operable to next pressure on the race, and the handle is screw-threadably secured to the second bushing, said handle mounting a cam which is operable, when the handle is rotated in the first direction, to engage the pair of pivotally mounted dogs and urge them into pressure applying positions relative to the race to cause rotational movement of the spool in the first direction; and means for imparting adjustable frictional resistance to the spool when it is moved in the second direction.

2. The fishing reel of claim 1 wherein the housing mounts a first spring-biased pawl, and the first bushing mounts a gear, said pawl operable to engage the gear mounted on the first bushing to inhibit rotation of the handle in the second direction, and the shaft has formed therein a plurality of radially disposed channels each of said channels dimensioned slidably to receive a ball bearing; and the means for securing the spool is a spring-biased plunger which is slidably mounted internally of the longitudinally disposed channel, said plunger operable to urge the ball bearing into a first locked attitude when the plunger is in a first position, and to permit the ball bearing to move to a second retracted attitude when the plunger is moved to a second attitude.

3. The fishing reel of claim 2 wherein the clutch means has a central bushing which is slidably borne on the first bushing, said central bushing adapted matingly to engage the spool, the central bushing further having an external surface which mounts a plurality of clutch teeth, and a rotatable housing, said rotatable housing having a peripheral surface which defines a plurality of pockets, each of the pockets adapted to receive an individual ball bearing, and the housing mounts a ratchet wheel, the central bushing freely rotatable, when the spool is rotated in the first direction, and when the spool is rotated in the second direction the central bushing captures the ball bearings between the clutch teeth and the peripheral surface of the rotatable housing, said central bushing causing the rotatable housing to rotate in the second direction.

4. The fishing reel of claim 3 wherein the means for imparting adjustable frictional resistance to the spool is a disc brake, said disc brake mounted on the housing and adapted to engage the ratchet wheel; and the housing further mounts a second spring-biased pawl which engages the ratchet wheel, said second spring-biased pawl operable to produce sound when the spool is rotated in the second direction.

5. A fishing reel adapted to be mounted on a fishing pole comprising:
a housing adapted to be mounted on the fishing pole;
a shaft mounted on the housing in an attitude substantially centrally thereof said shaft having a longitudinally disposed channel;
releasable locking means mounted internally of the longitudinally disposed channel;
first bushing means slidably borne on the shaft, said first bushing means mounting a gear;
rotational locking means mounted on the housing and engageable with the gear, said rotational locking means operable to allow rotation of the first bushing in a first direction and preventing rotation of the first bushing in a second direction;
adjustable drag means mounted on the housing;
clutch means slidably borne on the first bushing means, said clutch means engageable by the drag means and operable to rotate freely when rotatably urged in the first direction;
handle means mounting a cam for transmitting force to the first bushing in the first direction;
second bushing means affixed to the handle and operable to engage the first bushing means, the second bushing mounting a pair of pivotally mounted dogs, said dogs engaged by the cam and movable between a first position and a second position; and
a spool rotatably borne on the first and second bushing means, said spool having a first end mounting means engageable with the clutch means, and having a second end mounting a race, said race disposed to have pressure applied thereto by the pair of pivotally mounted dogs such that when the handle means is rotated in a first direction, the pair of dogs applies said pressure to the race thus imparting rotational movement to the spool in the first direction, and when the spool is rotatably urged in the second direction, the dogs are urged into the second position and the adjustable drag means imparts frictional resistance to the spool.

6. The fishing reel of claim 5 wherein the shaft has formed therein a plurality of radially disposed channels which communicate with the longitudinally disposed channel, each radially disposed channel dimensioned individually to receive a ball bearing; and the releasable locking means is a spring-biased plunger which is operable when placed in a first position to urge the individual ball bearings into a locked attitude, and when moved to a second position permitting the ball bearings to move into a retracted position, said ball bearings when urged into the locked attitude securing the first and second bushing means in interlocking relation.

7. The fishing reel of claim 6 wherein the rotational locking means is a first spring-biased pawl and the adjustable drag means is a disc brake, said disc brake mounting a screw-threadable adjustment member which extends externally of the housing.

8. The fishing reel of claim 7 wherein the clutch means has a central bushing which rotatably mounts a housing having a perpipheral surface, said central bushing further having an external surface which has formed therein a plurality of clutch teeth, the peripheral surface defines a plurality of pockets, the pockets individually adapted to receive an individual ball bearing, the ball bearings operable, when the central bushing is rotated in the first direction to ride over the clutch teeth, and when the central bushing is rotated in the second direction, the ball bearings are captured between the clutch teeth and the peripheral surface of the internal chamber thus causing rotation of the housing in the second direction.

9. The fishing reel of claim 8 wherein the first end of the spool mounts a pair of teeth which engage the central bushing, and the race mounted at the second end of the spool defines a seat which is adapted to mount an O-ring.

10. The fishing reel of claim 9 wherein the housing mounted on the fishing pole mounts a first spring-biased pawl, and clutch means mounts a ratchet wheel, said first spring-biased pawl engaging the ratchet to generate sound when the spool is urged in the second direction.

11. The fishing reel of claim 5 wherein the race mounts an O-ring and the pivotally mounted dogs are resiliently urged out of engagement with the O-ring when the spool is rotatably urged in the second direction.

* * * * *

UNITED STATES PATENT AND TRADEMARK OFFICE
CERTIFICATE OF CORRECTION

PATENT NO. : 4,750,687
DATED : June 14, 1988
INVENTOR(S) : Albert V. Sievert, Steven A. Sievert It is certified that error appears in the above-identified patent and that said Letters Patent is hereby corrected as shown below:

Column 8, line 29, delete "received" and substitute ---receive---.

Column 10, line 68, delete "next" and substitute ---exert---.

Signed and Sealed this

First Day of November, 1988

Attest:

DONALD J. QUIGG

*Attesting Officer*     *Commissioner of Patents and Trademarks*